(12) United States Patent
Amsterdamer et al.

(10) Patent No.: US 12,449,621 B2
(45) Date of Patent: Oct. 21, 2025

(54) FIBER OPTIC CABLE LABELING SYSTEM AND METHODS OF MANUFACTURING THE SAME

(71) Applicant: LiteLinx Broadband Solutions, Inc., Albany, NY (US)

(72) Inventors: Yishai Amsterdamer, Albany, NY (US); Harshul Garg, Kanata (CA); Shanmugham Kalaichelvan, Toronto (CA)

(73) Assignee: LiteLinx Broadband Solutions, Inc., Albany, NY (US)

( * ) Notice: Subject to any disclaimer, the term of this patent is extended or adjusted under 35 U.S.C. 154(b) by 0 days.

(21) Appl. No.: 18/811,967

(22) Filed: Aug. 22, 2024

(65) Prior Publication Data
US 2025/0291142 A1    Sep. 18, 2025

Related U.S. Application Data

(60) Provisional application No. 63/566,683, filed on Mar. 18, 2024.

(51) Int. Cl.
*G02B 6/44* (2006.01)

(52) U.S. Cl.
CPC ........... *G02B 6/443* (2013.01); *G02B 6/4482* (2013.01)

(58) Field of Classification Search
CPC ........................................................ G02B 6/44
USPC ............................................................ 385/100
See application file for complete search history.

(56) References Cited

U.S. PATENT DOCUMENTS

| | | | | |
|---|---|---|---|---|
| 2011/0025467 A1* | 2/2011 | Longhurst | ............ | G06K 7/0008 340/10.1 |
| 2011/0025468 A1* | 2/2011 | Longhurst | ............ | H01Q 1/2208 385/100 |

FOREIGN PATENT DOCUMENTS

| | | | | |
|---|---|---|---|---|
| CA | 2388767 A1 | * | 5/2001 | |
| CA | 2773855 C | * | 2/2018 | ............ B66C 13/12 |
| CN | 117666050 A | * | 3/2024 | |
| WO | WO-2009118505 A1 | * | 10/2009 | ............ G01V 15/00 |
| WO | WO-2009118529 A1 | * | 10/2009 | ............ G02B 6/447 |

\* cited by examiner

*Primary Examiner* — Kaveh C Kianni
(74) *Attorney, Agent, or Firm* — Womble Bond Dickinson (US) LLP

(57) ABSTRACT

A cable has a first end and a second end with the length of the cable being defined therebetween. The cable includes an outer jacket of plurality of internal lines disposed within the outer jacket and a plurality of labels. A plurality of labels are secured at predetermined intervals along the length of the cable. Each label of the plurality of labels includes an electronic tag. Each electronic tag includes information relevant to the cable and is configured to be read by a scanner external to the cable.

15 Claims, 5 Drawing Sheets

FIBER OPTIC CABLE LABELING SYSTEM AND METHODS OF MANUFACTURING THE SAME

CROSS-REFERENCE TO RELATED APPLICATION

This application claims benefit of, and priority to, U.S. Provisional Patent Application Ser. No. 63/566,683, filed Mar. 18, 2024, the entire contents of which are hereby incorporated by reference.

BACKGROUND

1. Technical Field

The present disclosure relates to cables and, more specifically, a cable that includes one or more labels having information relevant to the cable.

2. Discussion of Related Art

When installing infrastructure, it may be difficult to identify and track individual cables. Some current methods include using cables with different color outer jackets or covers, placing labels on or adjacent the ends of the cables, or otherwise marking the cables in the field.

The current methods may cause difficulty in identifying cables at locations other than the ends of the cables that include the labels. In some situations, the labels may fall off or be misplaced.

SUMMARY

This disclosure relates generally to a labeling system for cables including fiber optic cables and methods of manufacturing the same.

In an aspect of the present disclosure, a cable with a first end and a second end that define a length between the first end and the second and includes an outer jacket, a plurality of internal lines, and a plurality of labels. The plurality of internal lines are disposed within the outer jacket. The plurality of labels are secured at predetermined intervals along the length of the cable. Each label of the plurality of labels includes an electronic tag. Each electronic tag includes information relevant to the cable and is configured to be read by a scanner external to the cable.

In aspects, information relevant to the cable includes a length mark of the cable at the respective label of the plurality of labels. Information relevant to the cable may include a production batch of the cable or serial number of the cable. Each electronic tag may be disposed within the outer jacket of the cable. Each electronic tag may be embedded in the outer jacket of the cable.

In some aspects, each label of the plurality of labels may include visual indicia on the outer jacket. The visual indicia may include a link marked indicating a length of the cable at the respective label. The predetermined intervals may be 1 foot, 1 yard, or 1 meter. One or more lines of the plurality of internal lines may include one or more filaments of optical fiber.

In another aspect of the present disclosure, a cable that has a first end and a second end that define a length of the cable therebetween and includes an outer jacket, a plurality of internal lines, and a plurality of labels. The plurality of internal lines are disposed within the outer jacket. The plurality of labels are secured at predetermined intervals along the length of the cable. Each label of the plurality of labels includes electronic tag and visual indicia that includes information relevant to the cable. Each electronic tag is configured to be read by a scanner external to the cable. Each visual indicia is printed on or is applied to the outer surface of the outer jacket.

In aspects, the visual indicia includes a length mark of the cable at the respective label of the plurality of labels. The electronic tag may include a length mark of the cable at the respective label of the plurality of labels. The electronic tag may also include a production batch of the cable or serial number of the cable.

In some aspects, each electronic tag is disposed within the outer jacket of the cable. Each electronic tag may be embedded in the outer jacket of the cable. The predetermined intervals may be 1 foot, 1 yard, or 1 meter.

In another aspect of the present disclosure, a method of manufacturing a cable includes sheathing a plurality of lines to form a cable and labeling the cable at predetermined intervals along the length of the cable. Labeling the cable includes disposing of electronic tag within an outer jacket of the cable and associating information relevant to the cable with each electronic tag.

In some aspects, associating information relevant to the cable with each electronic tag includes associating a respective length mark of the cable with the respective electronic tag. Associating information relevant to the cable with each electronic tag may include associating a production batch of the cable or serial number of the cable with each electronic tag. Disposing the electronic tag within the outer jacket may include embedding the electronic tag in an internal or an external surface of the outer jacket.

In certain aspects, labeling the cable may include providing visual indicia the on the outer surface of the outer jacket of the cable. Providing the visual indicia the on the outer surface of the outer jacket cable may include printing or stickering individual indicia on the outer surface. Providing visual indicia on the outer surface may include providing visual indicia at each electronic tag.

In another aspect of the present disclosure, a method of installing a cable includes unspooling a portion of the cable from a carrier and scanning the cable with a scanner as the cable is unspooled. The method may also include logging a scanned label of the cable while unspooling the portion of the cable and providing the log scanned labels to a tracking system after unspooling the portion of the cable.

In aspects, scanning the cable with the scanner includes the scanner being mounted to a machine or tool holding the cable on the spool. Logging the scanned label may include the scanner transmitting a signal to a computing device indicative of the scanned label. Scanning the cable with the scanner may include scanner reading electronic tag disposed within the outer jacket of the cable. Scanning the cable with the scanner may include identifying electronic tag of the label at predetermined intervals along the length of the cable. Logging the scanned label of the cable may include associating the physical location of the scanned label with the scanned label.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
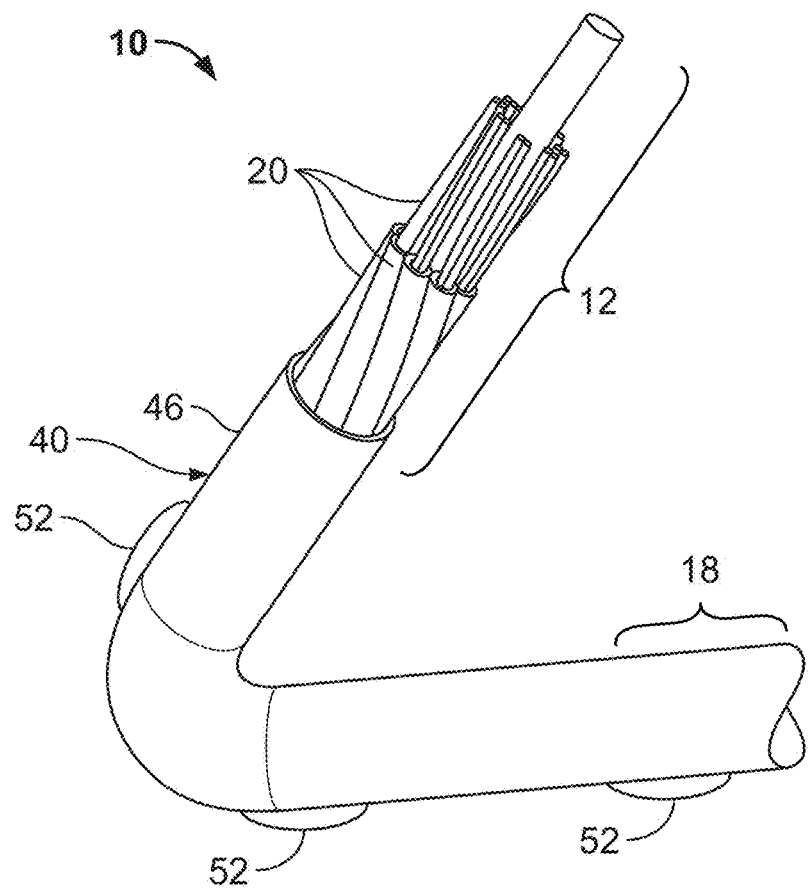
FIG. 1 is a side view of a portion of a cable provided in accordance with the present disclosure with internal lines of the cable exposed.
Figure 2:
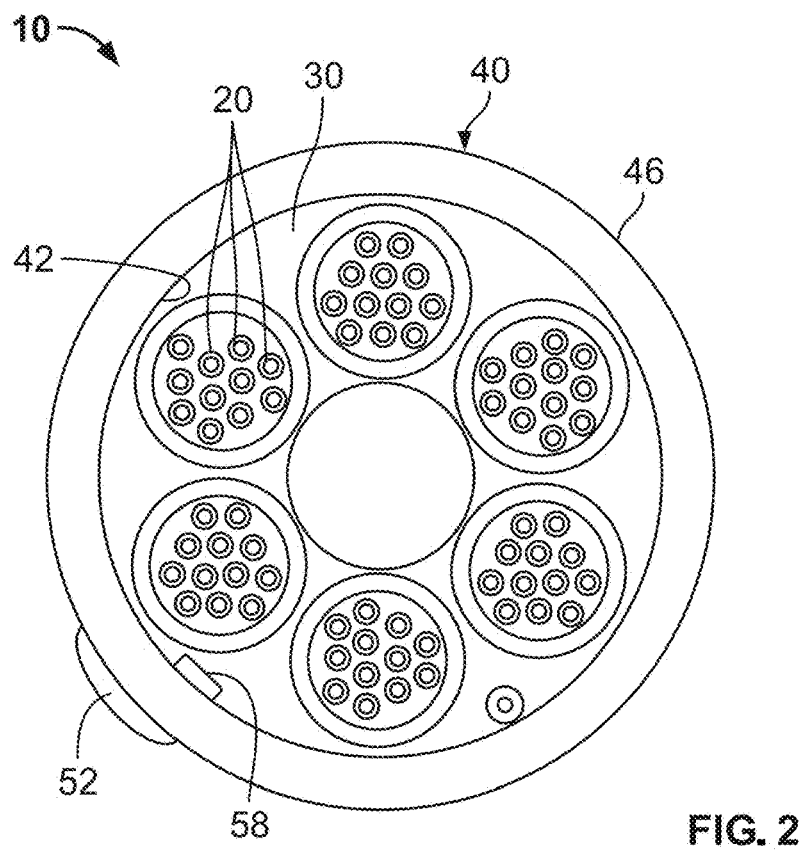
FIG. 2 is a cross-sectional view of the cable of FIG. 1.
Figure 3:
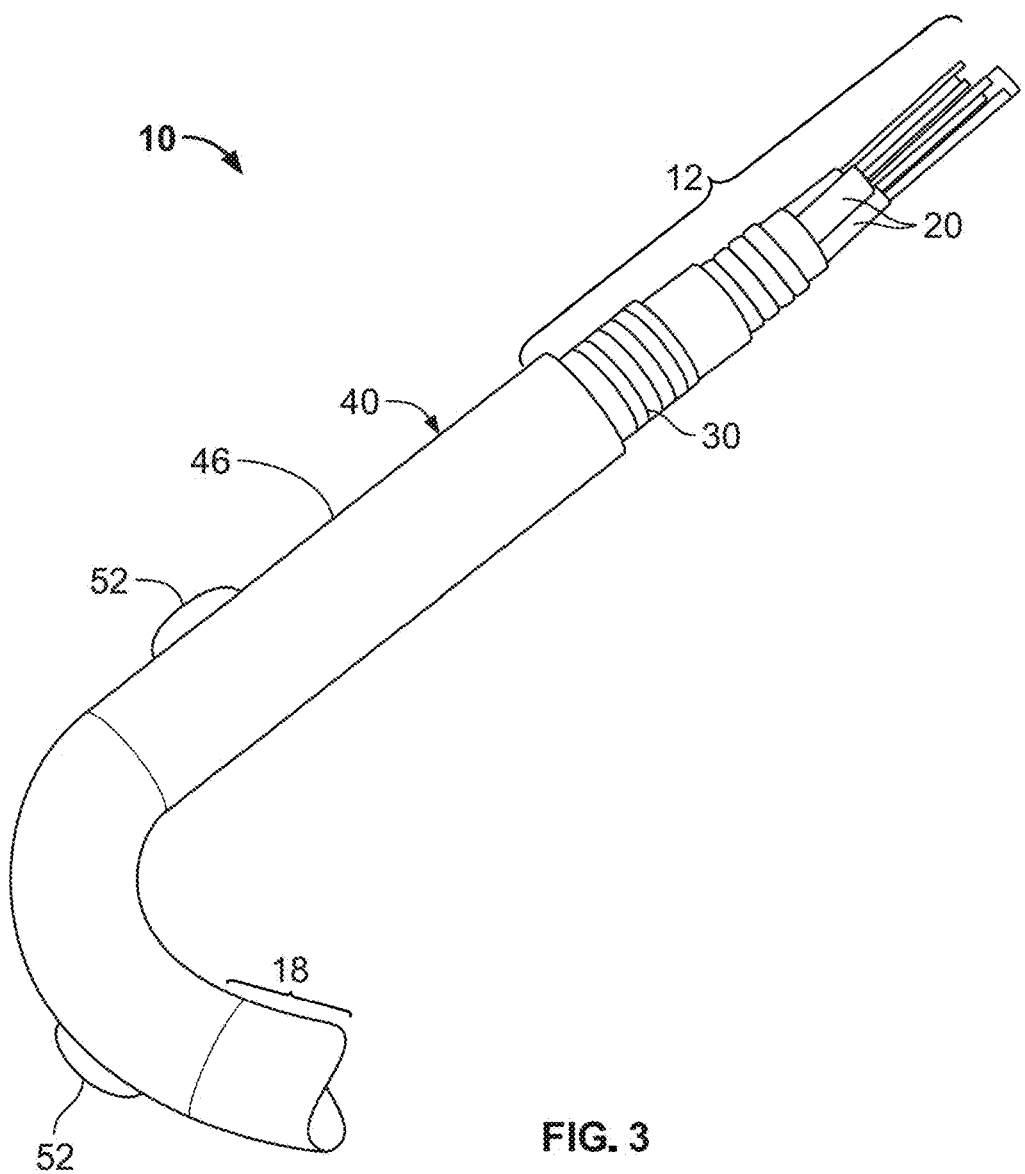
FIG. 3 is a side view of a portion of another cable provided in accordance with the present disclosure with internal lines of the cable exposed.
Figure 4:
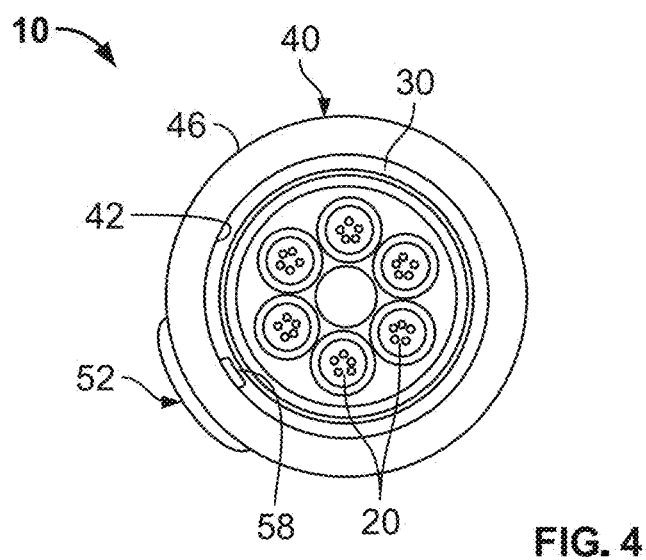
FIG. 4 is a cross-sectional view of the cable of FIG. 3.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

This disclosure relates generally to labeling systems for cables. The label system may allow for labeling different types of cables including optical cables such as fiber optical cables, electrical cables, networking cables, coaxial cables, and other types of cables. The labeling system may include labels adjacent the ends of the cables. In some embodiments, the labeling system may include labels at predetermined intervals along the length of the cable. For example, the labels may be disposed at intervals along the length of the cable with each interval being 1 foot, 1 yard, 1 meter, or other conventional unit of measurement suitable for the length of the cable.

Referring now to FIGS. 1-4, cables are provided according to the present disclosure and are referred to generally as cable 10. The cable 10 includes a first end portion 12 and a second end portion 18. The first end portion 12 and/or the second end portion 18 may include one or more connectors or terminators (not explicitly shown) that connect the cable 10 to equipment or other cables such that one or more signals are transmitted through the cable 10.

The cable 10 may include one or more internal lines 20. Each internal line 20 is formed of a suitable transmitter to transmit a signal along the length of the cable 10. Each internal line 20 may be a single filament optical fiber, a multifilament optical fiber, a solid core metallic wire, a multifilament metallic wire, or the like. When the cable 10 includes one or more filaments of optical fiber, the cable 10 may be considered a fiber optic cable. Each internal line 20 may include an insulative layer, a shield layer, and/or a cover layer. The insulative layer, the shield layer, and/or the cover layer may physically, optically, or electrically protect or shield the respective internal line 20 from the other internal lines 20 or an environment exterior to the cable 10.

The cable 10 includes an outer jacket 40 and may include an inner liner 30. The outer jacket 40 is disposed about the internal lines 20 such that the internal lines 20 are all within the outer jacket 40. The inner liner 30 may be disposed about all of the internal lines 20 to secure the internal lines 20 in position with one another. For example, the inner liner 30 may secure the internal lines 20 in a braided configuration with one another, a parallel configuration with one another, a coaxial configuration with one another, or a combination thereof. The inner liner 30 is disposed within the outer jacket 40.

The outer jacket 40 includes an interior surface 42 and an external surface 46. The cable 10 includes a label 52 that is disposed on the interior surface 42 or the external surface 46 of the outer jacket 40. In some embodiments, the label 52 is disposed within the interior surface 42. For example, the label 52 may be disposed between the interior surface 42 and an inner liner 30. In certain embodiments, the label 52 may be disposed between the interior surface 42 and the internal lines 20.

The label 52 includes pieces of information related to the cable 10. The pieces of information related to the cable 10 may include, but is not limited to, a serial number of the cable, a stock keeping unit (SKU) of the cable, a name of the product, a production batch of the cable, or combinations thereof. In some embodiments, the information related to the cable 10 may include a length mark for the specific cable. For example, a label 52 at a first end portion 12 of a respective cable 10 may include a first length mark and another label 52 at a X number of length units along the cable 10 may include a second length mark to provide indicia of the X number of length units. Specifically, a first length mark may be "1" and a second length mark 1 meter down the length of the cable 10 may be "2".

The label 52 may be applied to the external surface 46 of the outer jacket 40 by adhesive glue or by printing directly on the outer jacket 40. The label 52 may be applied within the outer jacket 40 with tape such as water blocking tape, armor, tubes, or yarns. In some embodiments, the label 52 is a sticker that is applied to the external surface 46. In certain embodiments, the label 52 may be printed directly to the external surface 46. In particular embodiments, the label 52 may be burned directly into the external surface 46. When the label 52 is disposed on or in the external surface 46, the label 52 may provide one or more pieces of the information as visual information that can be read directly by a user. In some embodiments, the label 52 may provide one or more pieces of information by a code, e.g., a bar code or a quick response code "QR" code. For example, a length mark may be provided as visual information and the rest of the information may be in the form of a QR code.

The label 52 may include electronic tags or markers. For example, the label 52 may include an electronic chip or tag 58. The electronic tag 58 may be a radio frequency identification tag "RFID tag" or a near-field communication tag "NFC tag" that includes one or more pieces of information. In some embodiments, the electronic tag 58 may be applied to or embedded in the external surface 46 of the outer jacket 40. In certain embodiments, the electronic tag 58 may be embedded in the interior surface 42 of the outer jacket 40. In particular embodiments, the electronic tag 58 may be disposed on or secured to the inner liner 30 with the outer jacket 40 disposed over the electronic tag 58 and the inner liner 30. The label 52 may be marked on the external surface 46 adjacent to or over an electronic tag 58 disposed within the outer jacket 40.

In embodiments, the labels 52 of a cable 10 may vary along the length of the cable 10. The labels 52 of a cable 10 may vary based on the location along the cable 10 or vary at set intervals along the length of the cable 10. In some embodiments, a cable 10 may include a label 52 every interval or unit along the length of the cable 10 with the unit being a meter, a foot, or a yard. In such embodiments, every label 52 may include a visual label on or in the external surface 46 of the outer jacket 40 and every other, third, fourth, or other number of labels 52 may include an electronic tag 58 including additional pieces of information. The visual label may include a length mark and/or other pieces of information with respect to the cable 10.

The labels 52 detailed above are described with respect to being on a cable 10. However, it is contemplated that the labels 52 may be used with multi service terminal ("MST"), fiber optic splice closure ("FOSC"), an aerial terminal, a wiring cabinet, a wiring closet, a rack, a shelf of a rack, or other equipment related to cabling infrastructure. In some embodiments, the labels 52 may be stickers that may be applied to an external surface of equipment during manufacture or in the field. The stickers may be self-adhesive and may include visual information and/or an embedded electronic tag 58.

Figure 5:
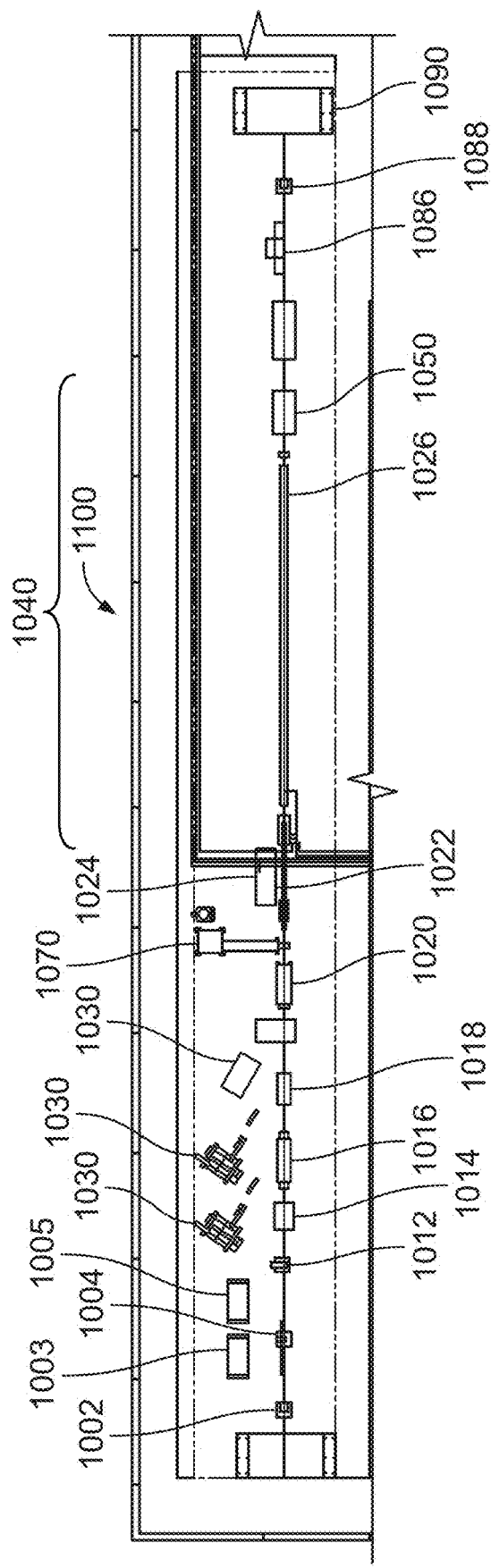
FIG. 5 is a schematic view of equipment for manufacturing a cable in accordance with the present disclosure.

Referring now to FIG. 5, a method of manufacturing a cable is provided in accordance with the present disclosure and is referred to generally as method 1100. The cable manufactured by the method 1100 may be any of the cables 10 detailed above. The method 1100 may include forming the internal lines 20 of the cable in a traditional manner with the labeling occurring in the sheathing process of manufacturing the cable. An example system for performing one or more steps of the method 1100 are shown in the manufacturing system 1000 shown in FIG. 5.

For example, as shown in FIG. 5, the line manufacturing the cable may include a fixed guide wheel support 1002 and a tension dancer 1004. The guide wheel support 1002 and the tension dancer 1004 may receive one or more lines from pay off tubes 1003, 1005. The system 1000 may include an aluminum or steel payoff machine 1012 that receives the lines from the tension dancer 1004 and feeds the lines with a tape to a tape welder 1014. The welder 1014 may provide the assembly to tape accumulator 1016 which provides the assembly to a tape corrugator 1018. The system may include a tap longitudinal forming device 1020. The system 1000 may also include one or more water troughs 1022, 1026 that receive the cable such that the cable passes therethrough. In addition, the system 1000 may include a dancer 1086, a guide wheel 1088, and a final take up device 1090. In addition, as detailed below, the system 1000 may include additional devices to label the cable during manufacturing.

For example, a printer 1050 may be added in the system 1000 that will print the label 52 including visual information directly onto the external surface 46 of the cable 10 during the sheathing process of the cable (Process 1150). The printer 1050 may be a high-speed printer such that the printing of the visual information may not affect the speed of the sheathing process. The printer 1050 may be loaded with software that varies the visual information of the label 52 during the sheathing process. For example, the software may increment the length mark of the label 52 with each label 52. In some embodiments, the printer 1050 may vary other pieces of information of the label 52 from each label 52 to the next. Printing the label 52 on the external surface 46 of the cable 10 may include printing a QR code onto the external surface 46 of the cable 10. When a QR code is printed onto the external surface 46, a length mark or other pieces of visual information may be included adjacent to the QR code.

Figure 6:
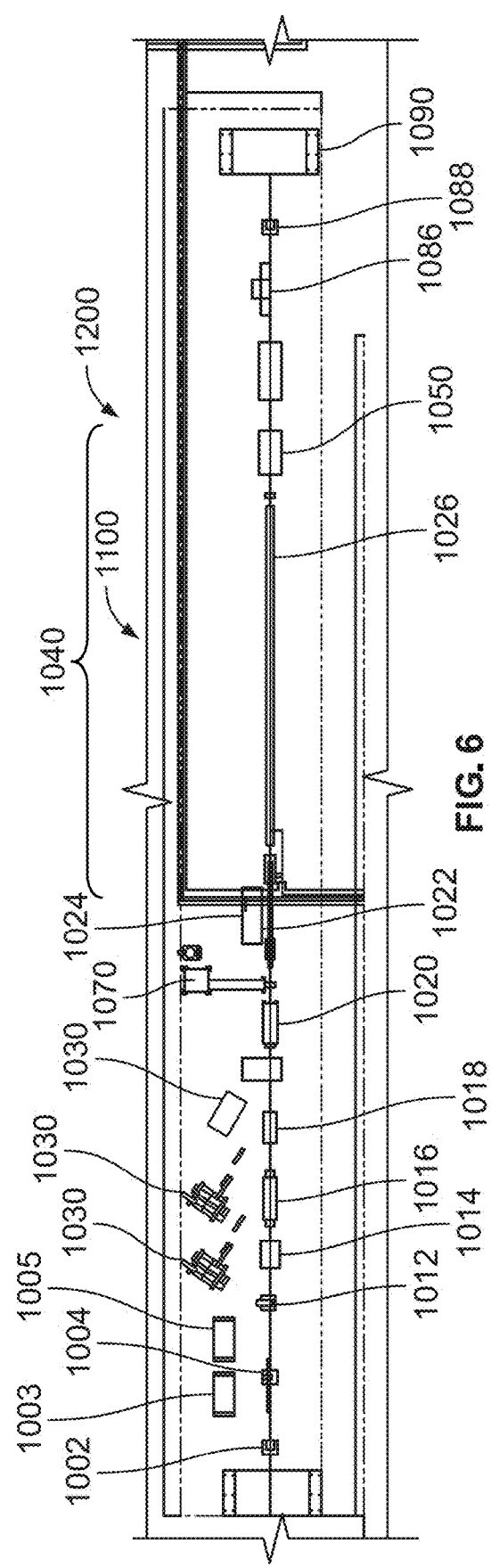
FIG. 6 is a schematic view of equipment for manufacturing a cable in accordance with the present disclosure.

With reference now to FIG. 6, another method of manufacturing a cable is provided in accordance to the present disclosure and is referred to generally as method 1200. The cable manufactured by the method 1200 may be any of the cables 10 detailed above. The method 1200 may include forming the internal lines 20 of the cable in a traditional manner with the labeling occurring in the sheathing process of manufacturing the cable. Specifically, a labeling machine 1060 will be added in the sheathing equipment 1040 that will apply a label 52 including visual information onto the external surface 46 of the cable 10 during the sheathing process (Process 1250). The labeling machine 1060 may be a high-speed labeling machine such that labeling may not affect the speed of the sheathing process. The labeling machine 1060 may be loaded with software that varies the visual information of the label 52 during the sheathing process. For example, the software may increment the length mark of the label 52 with each label 52. In some embodiments, the labeling machine 1060 may vary other pieces of information of the label 52 from each label 52 to the next. Applying the label 52 on the external surface 46 of the cable 10 may include a QR code. When a QR code is included, a length mark or other pieces of visual information may be included adjacent to the QR code. In some embodiments, the method 1200 may include printing a portion of the label 52 and labeling another portion of the label 52. For example, a sticker or label may be applied including a QR code having pieces of information and other pieces of information of the label 52 may be printed directly onto the external surface 46. In some embodiments, a QR code is including pieces of information for the cable 10 is applied to the external surface 46 and a length mark is printed onto the external surface 46 adjacent to the QR code. In some embodiments, the labeling machine 1060 may apply a label 52 including an electronic tag 58. The electronic tag 58 may be applied with or without any visual information.

Figure 7:
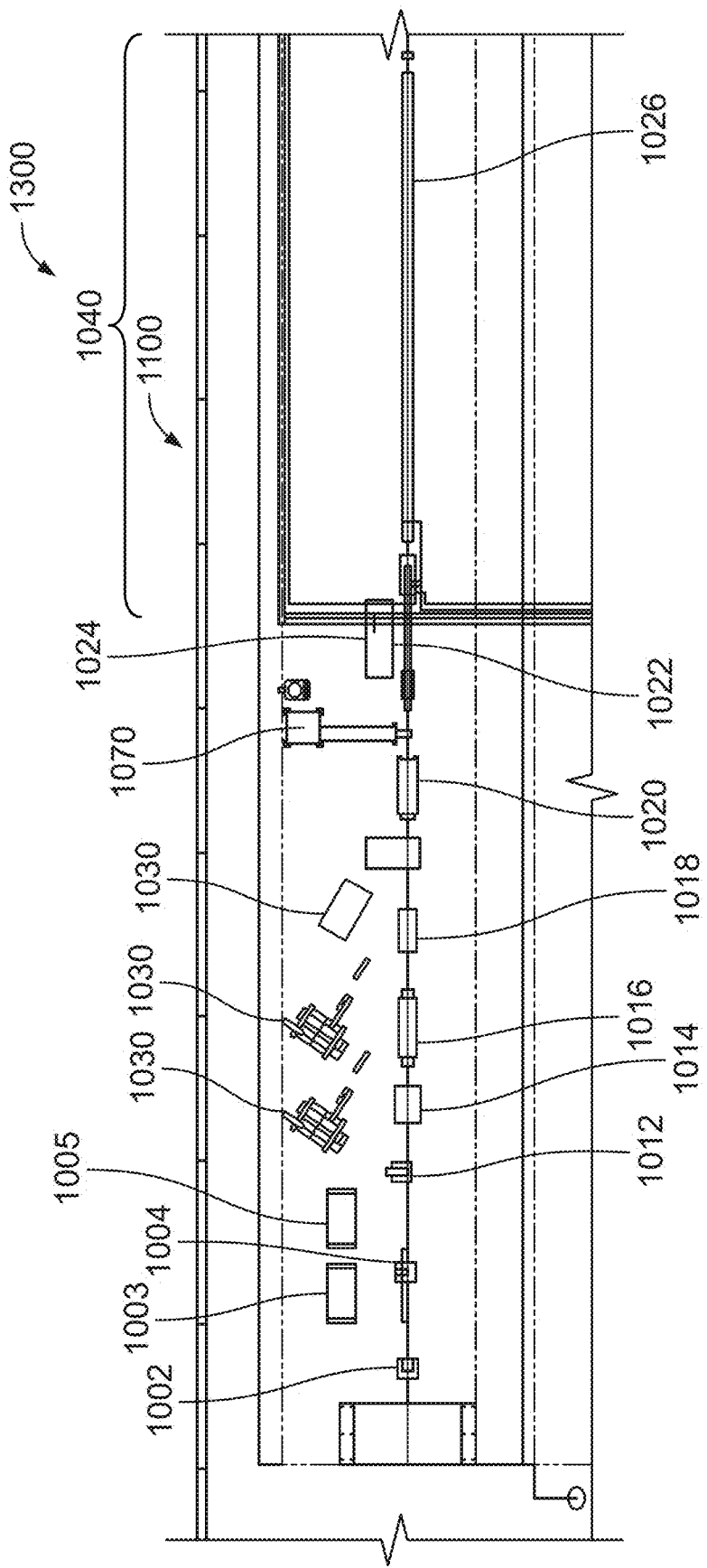
FIG. 7 is a schematic view of equipment for manufacturing a cable in accordance with the present disclosure.

With reference now to FIG. 7, another method of manufacturing a cable is provided in accordance to the present disclosure and is referred to generally as method 1300. The cable manufactured by the method 1300 may be any of the cables 10 detailed above. The method 1300 may include forming the internal lines 20 of the cable in a traditional manner with the labeling occurring before the sheathing process of manufacturing the cable. Specifically, a labeling machine 1030 will be added to the manufacturing line before the sheathing equipment 1040 that will apply a label 52 to the cable 10 (Process 1350). The labeling machine 1030 applies an electronic tag 58 to the cable 10 such that the electronic tag 58 is disposed within an outer jacket 40 after the outer jacket 40 is applied during the sheathing process. The labeling machine 1030 may be a high-speed labeling machine such that labeling may not affect the speed of the sheathing process. The labeling machine 1030 may be loaded with software that varies the electronic tags 58 before the electronic tags 58 are applied to the cable 10. The labeling machine 1030 may apply the electronic tag 58 to an inner liner 30 or sheath of the cable 10 or may position the electronic tag 58 to be secured to the interior surface 42 of the outer jacket 40 when the outer jacket 40 is applied to the cable 10. For example, the software may increment a length mark or information of the label 52 with each label 52. In some embodiments, the labeling machine 1030 may vary other pieces of information of the label 52 from each label 52 to the next. In some embodiments, the method 1300 may also include applying a portion of one or more labels 52 on the external surface 46 of the cable 10. For example, a length mark or a QR code may be applied to the external surface 46 adjacent one or more of the electronic tags 58 disposed within the outer jacket 40. When a QR code is included, a length mark or other pieces of visual information may be included adjacent to the QR code. In some embodiments, the method 1300 may include printing a portion of the label 52 and labeling another portion of the label 52. For example, a sticker or label may be applied including a QR code having pieces of information and other pieces of information of the label 52 may be printed directly onto the external surface 46. In some embodiments, a QR code is including pieces of information for the cable 10 is applied to the external surface 46 and a length mark is printed onto the external surface 46 adjacent to the QR code.

Although the method steps are described in a specific order, it should be understood that other steps may be performed in between described steps, described steps may be adjusted so that they occur at slightly different times, or the described steps may occur in any order unless otherwise specified.

Figure 8:
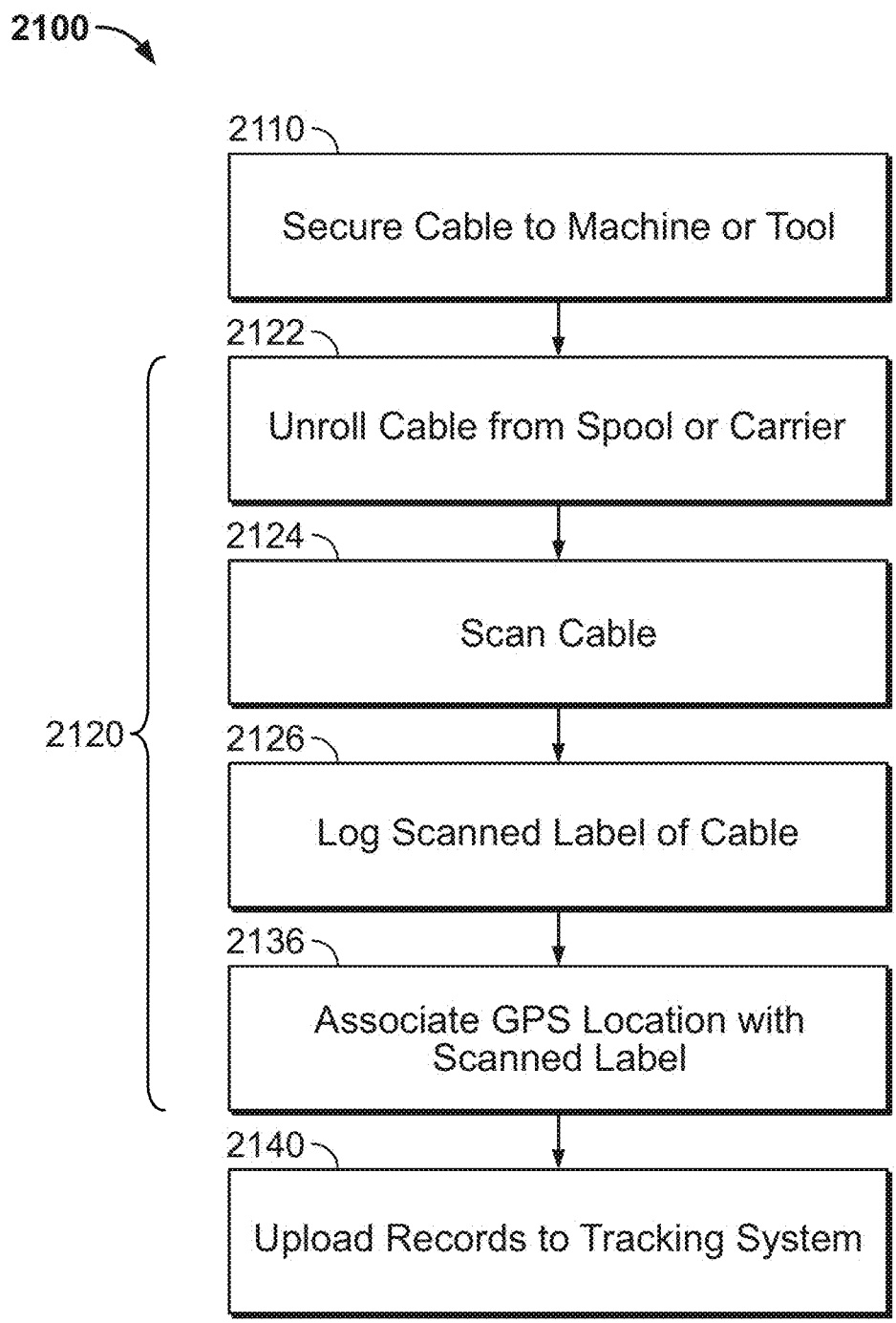
FIG. 8 is a flowchart of a method for installing cable in accordance with the present disclosure.

Referring now to FIG. 8, a method 2100 of installing cable is disclosed in accordance with the present disclosure. The method 2100 is described herein with reference to the cable 10 detailed in FIGS. 1-4. The method 2100 includes securing a spool, roll, or quantity of cable to a machine or tool for installing the cable 10 (Step 2110). With the cable 10 secured to the machine or tool, the machine or tool is used to install the cable 10 (Process 2120). For example, the machine may be a lashing machine to lash the cable 10 to another wire or cable or a trenching machine to lay cable underground. In some embodiments, the tool may be a handheld tool or hand operated tool to distribute or install a cable. During installation of the cable 10, the cable 10 is unrolled from a spool or a carrier (Step 2122). As the cable 10 is unrolled, a scanner mounted to the tool or machine scans the cable 10 to identify the cable 10 (Step 2124). The scanner may scan the cable 10 by reading the label 52 on the cable 10. The scanner may read the label 52 optically and/or electronically. For example, the scanner may read an electronic tag 58 of the label 52 as the cable 10 is unrolled past the scanner. In some embodiments, the scanner may visually read a piece of information from the label 52, e.g., a length mark. In some embodiments, the cable 10 is scanned by a scanner that is separate from the machine or tool installing the cable, e.g., a handheld scanner that logs the position and the GPS location of the cable 10.

As the scanner scans the cable 10, the scanner may log or record the location of the particular label 52 of the cable 10 (Step 2126). As the scanner logs or records the location of the particular label 52, the scanner may also acquire a global positioning system (GPS) location of the particular label 52 (Step 2136). After a cable or a plurality of cables are installed, the scanner may upload a log or records of the location and/or GPS location of a particular label 52 or a cable 10 such that a map of the installed cable 10 is created in a tracking system (Step 2140).

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A cable having a first end and a second end with a length of the cable being defined between the first end and the second end, the cable comprising:
   an outer jacket;
   a plurality of internal lines disposed within the outer jacket; and
   a plurality of labels secured at predetermined intervals along the length of the cable, the plurality of labels including a tape disposed within the outer jacket, the tape including a plurality of electronic tags secured to the tape at predetermined intervals along a length of the tape, each electronic tag including information relevant to the cable and configured to be read by a scanner external to the cable.

2. The cable according to claim 1, wherein information relevant to the cable includes a length mark of the cable at the respective label of the plurality of labels.

3. The cable according to claim 1, wherein information relevant to the cable includes a production batch of the cable and a serial number of the cable.

4. The cable according to claim 1, wherein each electronic tag is embedded in the outer jacket of the cable.

5. The cable according to claim 1, wherein each label of the plurality of labels includes visual indicia on the outer jacket.

6. The cable according to claim 5, wherein the visual indicia includes a length mark indicating a length of the cable at the respective label.

7. The cable according to claim 1, wherein the predetermined intervals are one of 1 foot, 1 yard, or 1 meter.

8. The cable according to claim 1, wherein one or more lines of the plurality of internal lines include one or more filaments of optical fiber.

9. The cable according to claim 1, wherein each label includes a QR code on the outer jacket.

10. A cable having a first end and a second end with a length of the cable being defined between the first end and the second end, the cable comprising:
    an outer jacket having an outer surface;
    a plurality of internal lines disposed within the outer jacket; and
    a plurality of labels secured at predetermined intervals along the length of the cable, plurality of labels including a tape disposed within the outer jacket, the tape including a plurality of electronic tags secured to the tape at predetermined intervals along a length of the tape, each label of the plurality of labels including visual indicia including information relevant to the cable, each electronic tag configured to be read by a scanner external to the cable, each visual indicia printed on or applied to the outer surface of the outer jacket.

11. The cable according to claim 10, wherein the visual indicia includes a length mark of the cable at the respective label of the plurality of labels.

12. The cable according to claim 10, wherein the electronic tag includes a length mark of the cable at the respective label of the plurality of labels, wherein the electronic tag also includes a production batch of the cable or a serial number of the cable.

13. The cable according to claim 10, wherein each electronic tag is embedded in the outer jacket of the cable.

14. The cable according to claim 10, wherein the predetermined intervals are one of 1 foot, 1 yard, or 1 meter.

15. The cable according to claim 10, wherein each label includes a QR code on the outer jacket.

\* \* \* \* \*